United States Patent
Cumberton et al.

(10) Patent No.: US 6,282,191 B1
(45) Date of Patent: Aug. 28, 2001

(54) METHODS AND APPARATUS FOR TRANSPORTING NARROWBAND (VOICE) TRAFFIC OVER A BROADBAND (ATM) NETWORK

(75) Inventors: John Cumberton, Danbury; Pasquale Cassella, Woodbridge, both of CT (US); Ramanathan Ramanathan, Woburn, MA (US); Michael McLoughlin, Bethlehem, CT (US); Xing Chen, Plano, TX (US)

(73) Assignee: General DataComm, Inc., Middlebury, CT (US)

( * ) Notice: Subject to any disclaimer, the term of this patent is extended or adjusted under 35 U.S.C. 154(b) by 0 days.

(21) Appl. No.: 09/371,196

(22) Filed: Aug. 10, 1999

(51) Int. Cl.[7] .............................. H04M 7/00; H04L 12/28; H04L 12/56; H04L 12/66
(52) U.S. Cl. ..................... 370/352; 370/395; 370/410; 370/467; 379/220; 379/230
(58) Field of Search .................................. 370/351–354, 370/356, 392, 397, 399, 401, 409, 466–467, 522, 524, 384–385, 389, 395–396, 410; 379/230, 219, 220

(56) References Cited

U.S. PATENT DOCUMENTS

| | | | |
|---|---|---|---|
| 5,825,780 | * 10/1998 | Christie | 370/522 |
| 6,009,100 | * 12/1999 | Gausmann et al. | 370/397 |
| 6,169,735 | * 1/2001 | Allen, Jr. et al. | 370/352 |

OTHER PUBLICATIONS

Article entitled "Signalling System No. 7: A tutorial" by Modarressi and Skoog, IEEE Communications Magazine, Jul. 1990, pp. 19–35.

Internet Tutorial from MicroLegend SS7 Tutorial, 1997–1998, 18 pages.

* cited by examiner

*Primary Examiner*—Wellington Chin
*Assistant Examiner*—Maikhanh Tran
(74) *Attorney, Agent, or Firm*—David P. Gordon; David S. Jacobson; Thomas A Gallagher (57) ABSTRACT

A SS7 signalling router receives SS7 signalling regarding narrowband calls to be routed over the ATM network. When the SS7 router receives signalling from the SS7 network, it does not process the signalling, but reads the originator point code (OPC) and forwards the signalling via the ATM network to the ATM switch which is attached to the originator of the message. An interworking function (IWF) at the ATM switch processes the SS7 signalling by generating the appropriate ATM signalling to set up a circuit between the originating ATM switch and the destination ATM switch. The IWF at the originating ATM switch also processes the SS7 signalling by returning it to the SS7 router with the destination point code (DPC) of the PSTN switch coupled to the destination ATM switch. When the SS7 router receives an SS7 signalling message from an ATM switch, it forwards it to the SS7 network where it is sent to the DPC. The IWF at each ATM switch is preferably distributed among several processors including a signalling VSM controller (an SVSM), a plurality of VSM controllers and an ISUP controller. SS7 SUs enter the SVSM controller which separates MSUs from FISUs and LSSUs. The MSUs are sent to the ISUP controller which interrogates the CIC of the IAM messages and forwards the IAM information to the appropriate VSM controller for narrowband to broadband conversion.

20 Claims, 9 Drawing Sheets

METHODS AND APPARATUS FOR TRANSPORTING NARROWBAND (VOICE) TRAFFIC OVER A BROADBAND (ATM) NETWORK

This application is related to co-owned applications Ser. Nos. 09/289,463 and 09/289,464, both filed Apr. 9, 1999. The applicant hereby incorporates herein by reference the entire disclosure of said co-owned applications.

BACKGROUND OF THE INVENTION

1. Field of the Invention

The invention relates broadly to telecommunications. More particularly, the invention relates to methods and apparatus for redirecting common channel signalling system 7 (SS7) signalling messages through the asynchronous transfer mode (ATM) network.

2. State of the Art

Perhaps the most awaited, and now fastest growing technology in the field of telecommunications in the 1990's is known as Asynchronous Transfer Mode (ATM) technology. ATM is providing a mechanism for removing performance limitations of local area networks (LANs) and wide area networks (WANs) and providing bandwidth on the order of gigabits/second. Because ATM cells can carry many different kinds of data across a single backbone network, the ATM technology provides a unitary mechanism for broadband end-to-end telecommunications traffic.

Although the ATM network was originally conceived to eventually handle all types of data including ordinary narrowband voice telephone calls, its initial application was almost exclusively for the transport of broadband data transmissions. Initially, ATM technology was expensive to implement and existing narrowband TDM (time division multiplexing) technology was perfectly adequate for ordinary voice telephone calls. As ATM technology has been more and more accepted in recent years, there is now more incentive to migrate all communications traffic (including narrowband voice calls) onto the ATM network. The incentive to migrate all voice circuits onto the ATM network has been amplified by the popularity of the Internet. Existing narrowband telephone technology was designed to handle telephone calls which average four minutes in length. Today, with millions of people using narrowband voice circuits to connect via modem to the Internet, the average voice circuit call length has grown to well over twenty minutes. Thus, as "voice calls" become longer in length, the existing narrowband telephone technology becomes less adequate.

One challenge in migrating narrowband voice calls to the ATM network is that the signalling/addressing system used in the narrowband network for provisioning trunk lines is different from the signalling/addressing system used in the broadband ATM network for provisioning virtual circuits. The international standard signalling/addressing system for narrowband circuits is known as the Common Channel Signalling System No. 7 ("SS7", "Signalling System 7", or "C7").

Figure 1:
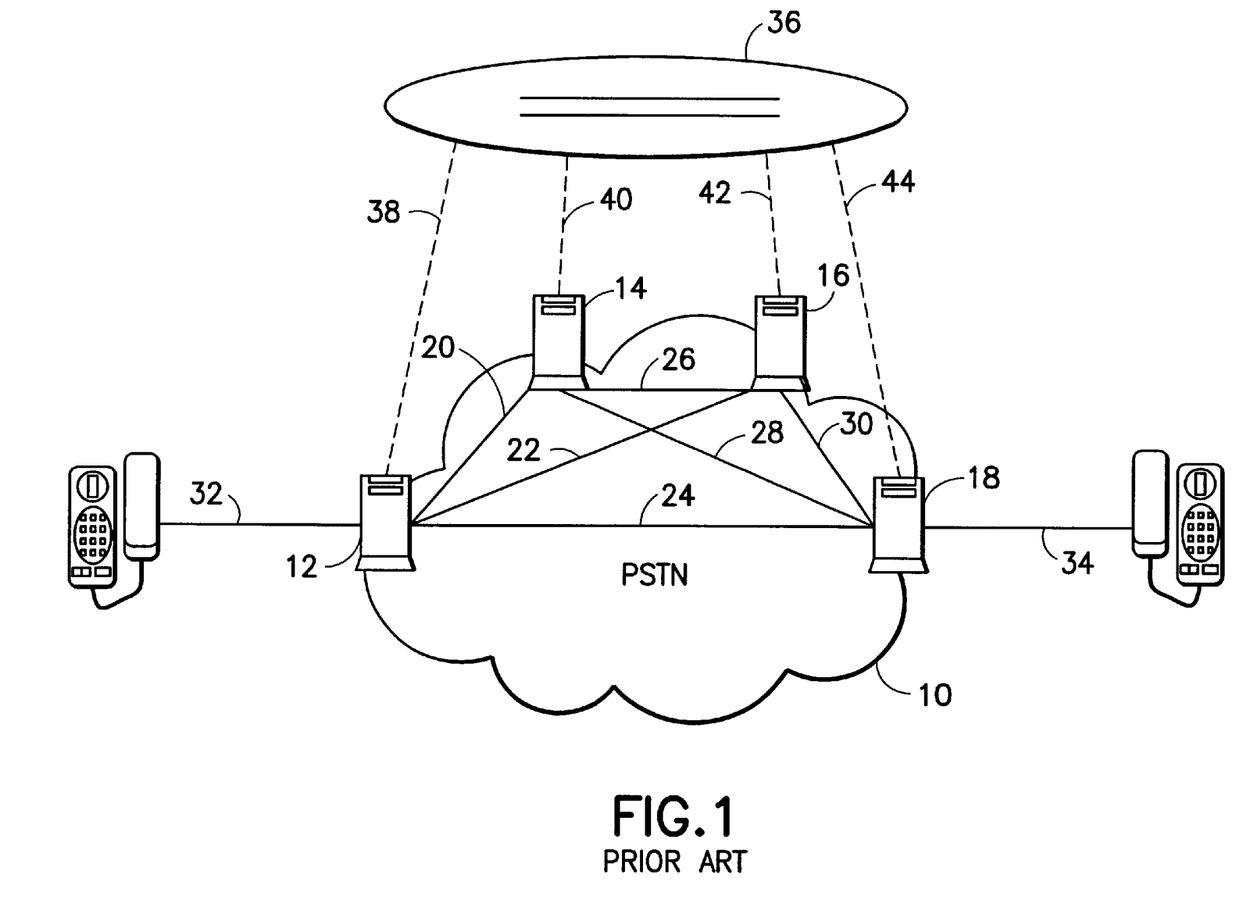
FIG. 1 is a schematic illustration of a prior art PSTN having a number of switches coupled to an SS7 network.

Prior art FIG. 1 illustrates how narrowband SS7 signalling operates. The public switched telephone network (PSTN) 10 includes a plurality of switches, e.g. 12, 14, 16, 18 which are interconnected via trunk lines 20, 22, 24, 26, 28, 30. Generally speaking, switches are located at central offices (COs) and at other locations determined by the length and nature of the trunk lines connecting the switches. Some of the switches in COs are directly connected to subscribers (class 4/5 switches). Other switches (tandem switches) couple switches to other switches. As shown in FIG. 1 switch 12 is connected to a subscriber line 32 and switch 18 is connected to a subscriber line 34. When the subscriber at subscriber line 32 calls the subscriber at subscriber line 34, at least two switches (12 and 18) will be involved in the connection. Depending on the level of congestion in the network 10, the call may need to be routed from switch 12 to switch 14 and/or switch 16 before reaching switch 18. The switches which originate and terminate the call are referred to as service switching points (SSPs). Network traffic between SSPs may be routed via a packet switch called a Signal Transfer Point (STP).

In order for a call to be correctly setup, managed, and torn down, all of the switches on the network must be able to communicate with each other. According to the SS7 protocol, each switch is coupled to the SS7 network. In FIG. 1, the SS7 network is shown as 36. In particular, each switch is connected to the SS7 network by a single clear channel link, typically a DS0 or 64 k link. FIG. 1 shown links 38, 40, 42, and 44 coupling switches 12, 14, 16, 18, respectively to the SS7 network. According to the SS7 standard, the SS7 network may also include one or more centralized databases (not shown) referred to as Service Control Points (SCPs). In order for a call to be completed, it may be necessary for the originating SSP to consult an SCP in order to obtain routing information.

Figure 2:
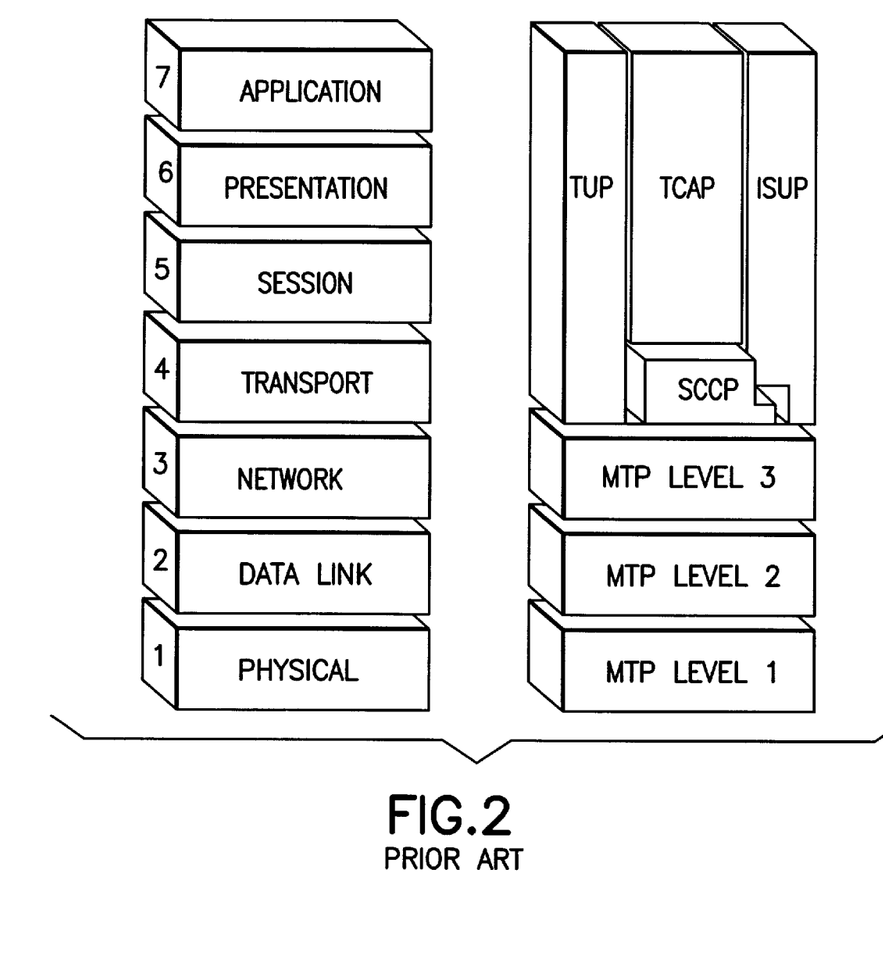
FIG. 2 is diagram of the SS7 protocol stack and the OSI reference model.

The hardware and software of the SS7 protocol are divided into functional abstractions called "levels" which map loosely to the Open Systems Interconnect (OSI) 7-layer model defined by the International Standards Organization (ISO). Prior art FIG. 2 illustrates the OSI reference model and the SS7 Protocol Stack.

The Message Transfer Part (MTP) is divided into three levels. The lowest level, MTP Level 1, is equivalent to the OSI Physical Layer. MTP Level 1 defines the physical, electrical, and functional characteristics of the digital signaling link. Physical interfaces defined include E-1 (2048 kb/s; thirty-two 64 kb/s channels), DS-1 (1544 kb/s; twenty-four 64 kb/s channels), V.35 (64 kb/s), DS-0 (64 kb/s), and DS-0A (56 kb/s). MTP Level 2 ensures accurate end-to-end transmission of a message across a signaling link. Level 2 implements flow control, message sequence validation, and error checking. When an error occurs on a signaling link, the message (or set of messages) is retransmitted. MTP Level 2 is equivalent to the OSI Data Link Layer. MTP Level 3 provides message routing between signaling points in the SS7 network. Each node in the SS7 network has a point code. Routing messages include the originating point code (OPC) as well as the destination point code (DPC). MTP Level 3 re-routes traffic away from failed links and signaling points and controls traffic when congestion occurs. MTP Level 3 is equivalent to the OSI Network Layer.

An SS7 message (carried in MTP Level 2) is called a signal unit (SU). There are three types of signal units: fill in signal units (FISU), link status signal units (LSSU), and message signal units (MSU). The FISUs are transmitted continuously unless other SUs are present. The LSSUs are used to control link alignment and to indicate the status of a signalling point, e.g. to signal an outage. The MSUs carry all call control, database query and response, network management, and network maintenance data.

The ISDN User Part (ISUP) defines the protocol used to set-up, manage, and release trunk circuits that carry voice and data between terminating line exchanges (e.g., between a calling party and a called party). ISUP is used for both ISDN and non-ISDN calls. However, calls that originate and terminate at the same switch do not use ISUP signaling. The basic messages used to setup and teardown a connection between switches include the CIC (circuit identification code). The CIC indicates the trunk circuit reserved by the originating switch to carry the call. The CIC is followed by one of the following message types: IAM (initial address message), ACM (address complete message), ANM (answer message), and REL (release message).

In some parts of the world (e.g., China, Brazil), the Telephone User Part (TUP) is used to support basic call setup and tear-down. TUP handles analog circuits only. In most countries, ISUP has replaced TUP for call management.

The Signaling Connection Control Part (SCCP) provides connectionless and connection-oriented network services and global title translation (GTT) capabilities above MTP Level 3. A global title is an address (e.g., a dialed 800 number, calling card number, or mobile subscriber identification number) which is translated by SCCP into a destination point code and subsystem number. A subsystem number uniquely identifies an application at the destination signaling point. SCCP is used as the transport layer for TCAP-based services.

The Transaction Capabilities Applications Part (TCAP) supports the exchange of non-circuit related data between applications across the SS7 network using the SCCP connectionless service. Queries and responses sent between SSPs and SCPs are carried in TCAP messages. For example, an SSP sends a TCAP query to determine the routing number associated with a dialed 800/888 number and to check the personal identification number (PIN) of a calling card user. In mobile networks (IS-41 and GSM), TCAP carries Mobile Application Part (MAP) messages sent between mobile switches and databases to support user authentication, equipment identification, and roaming.

Figure 3:
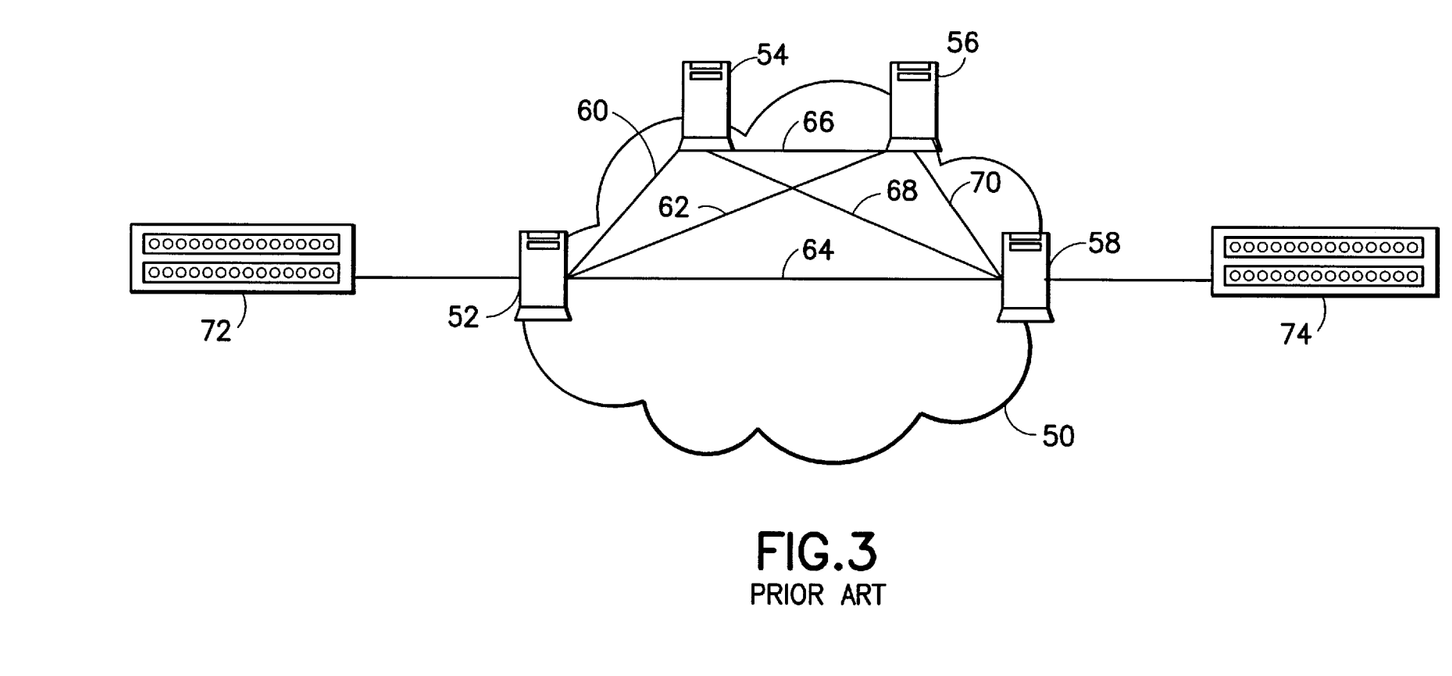
FIG. 3 is a schematic illustration of a prior art ATM network.

All of the above layered protocol messages are sent across the SS7 network, not through the PSTN shown in FIG. 1. In contrast, a typical ATM network 50 is shown in prior art FIG. 3. The network 50 includes a plurality of ATM switches, e.g. 52, 54, 56, 58 which are linked together by broadband links (preferably SDH/SONET links), e.g. 60, 62, 64, 66, 68, 70. ATM switches are generally located at COs, at other locations such as satellite links, or even at customer premises. As mentioned above, until recently, the ATM network was used almost exclusively for broadband data communications. As such, FIG. 3 shows a data service unit (DSU) 72 coupled to the ATM switch 52 and a DSU 74 coupled to the ATM Switch 58.

Those skilled in the art will appreciate that the ATM PDU (protocol data unit) is called a cell and that it comprises fifty-three octets, with five octets being reserved for the cell header and the remaining forty-eight octets being used by the ATM Adaptation Layer (AAL) and the user payload. Once a connection is set up, the header of each ATM cell bound for that connection includes addressing information, namely a Virtual Path Identifier (VPI) and a Virtual Channel Identifier (VCI). The first four octets of a cell can be coded in a variety of formats to identify nonuser payload cells. One such convention is "metasignalling" which is used to establish a session with the network and negotiate session services via the ATM Network.

Figure 4:
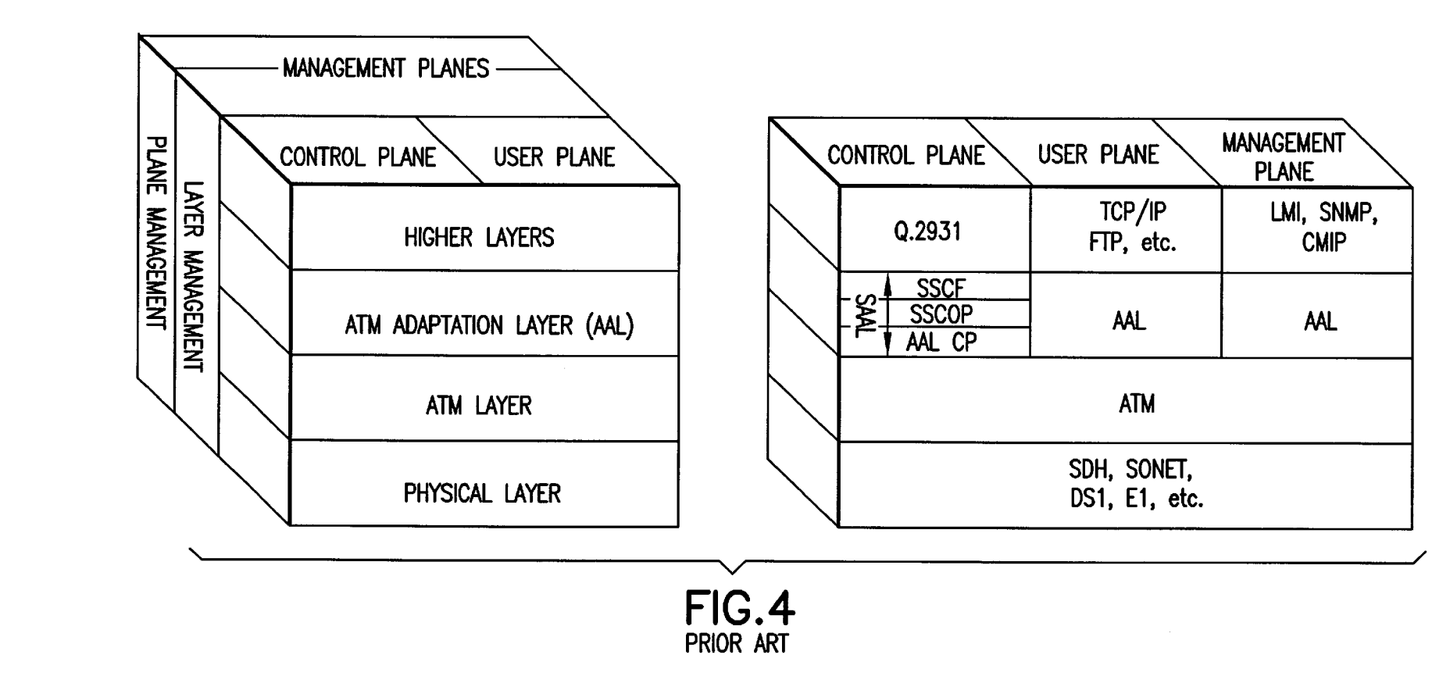
FIG. 4 is a diagram of the ATM reference model and the placement of protocols in the layers.

The ATM reference model, like the SS7 reference model, is based on the OSI reference model. Prior art FIG. 4 illustrates layers and planes of the ATM reference model on the left and examples of protocol placement on the right. While the physical layer may be almost any kind of network, the presently preferred medium for ATM traffic is the SDH/SONET optical network which provides the broadest bandwidth presently available. The ATM layer is responsible for managing the sending and receiving of cells, adding and processing the five octet cell header. The AAL is designed to support different types of applications and different types of traffic such as voice, video, and data. The higher layers are used to implement specific communications protocols for control, applications, and management. As seen best in the right hand side of FIG. 4, the AAL layer and higher layers are divided into three planes.

The control plane (C-plane) is used to setup connections in the ATM network using the Q.2931 signalling protocol in the higher layers. Below the Q.2931 signalling protocol lies the signalling ATM adaptation layer (SAAL). The SAAL supports the transport of Q.2931 messages between any two ATM switches which are running SVCs (switched virtual circuits). The SAAL contains three sublayers. The ATM adaptation layer common part (AAL CP) detects corrupted traffic transported across any interface using the C-plane procedures. The service specific connection-oriented part (SSCOP) supports the transfer of variable length traffic across the interface, and recovers from errored or lost service data units. The service specific coordination function (SSCF) provides the interface to the next upper layer, the Q.2931 signalling protocol.

The user plane (U-plane) contains user and application specific protocols such as TCP/IP, FTP, etc. The invocation of the U-plane protocols takes place only after the C-plane has set up a connection successfully or a connection has been pre-provisioned.

The management plane (M-plane) provides the required management services and is implemented with the ATM local management interface (LMI). The internet simple network management protocol (SNMP) and/or the OSI common management information protocol (CMIP) can also reside in the M-plane.

From the foregoing, it will be appreciated that the signalling protocols utilized in setup, tear down, and management of connections in the ATM network is very different from the protocols utilized by SS7 in the PSTN. As mentioned above, demand has recently grown for the carrying of voice over the ATM network. In response to that demand, various organizations such as the ITU-T and the ATM Forum have defined ATM Adaptation Level 2 (AAL2) standards and recommendations which are intended to integrate the carrying of voice data into the ATM scheme. While the AAL2 standard has been established, presently, there is very little commercial activity utilizing AAL2. This lack of activity is probably the result of the present requirements for the use of AAL2. In particular, presently, in order to utilize AAL2, the customer must provide the network with AAL2 type information in generating a call. Alternatively, a non-ATM type call may be carried in certain very limited circumstances by the ATM network by establishing for the user a PVC (permanent virtual channel) which carries all non-ATM voice data (i.e., there is a static map from the incoming narrowband call to an outgoing broadband call). However, these uses of AAL2 require either the purchase of specialized equipment by the user, or the maintenance of an expensive PVC link. True interworking for voice data between the narrowband network and the ATM network has not yet been established in the art.

3. Co-owned Technology

Figure 5:
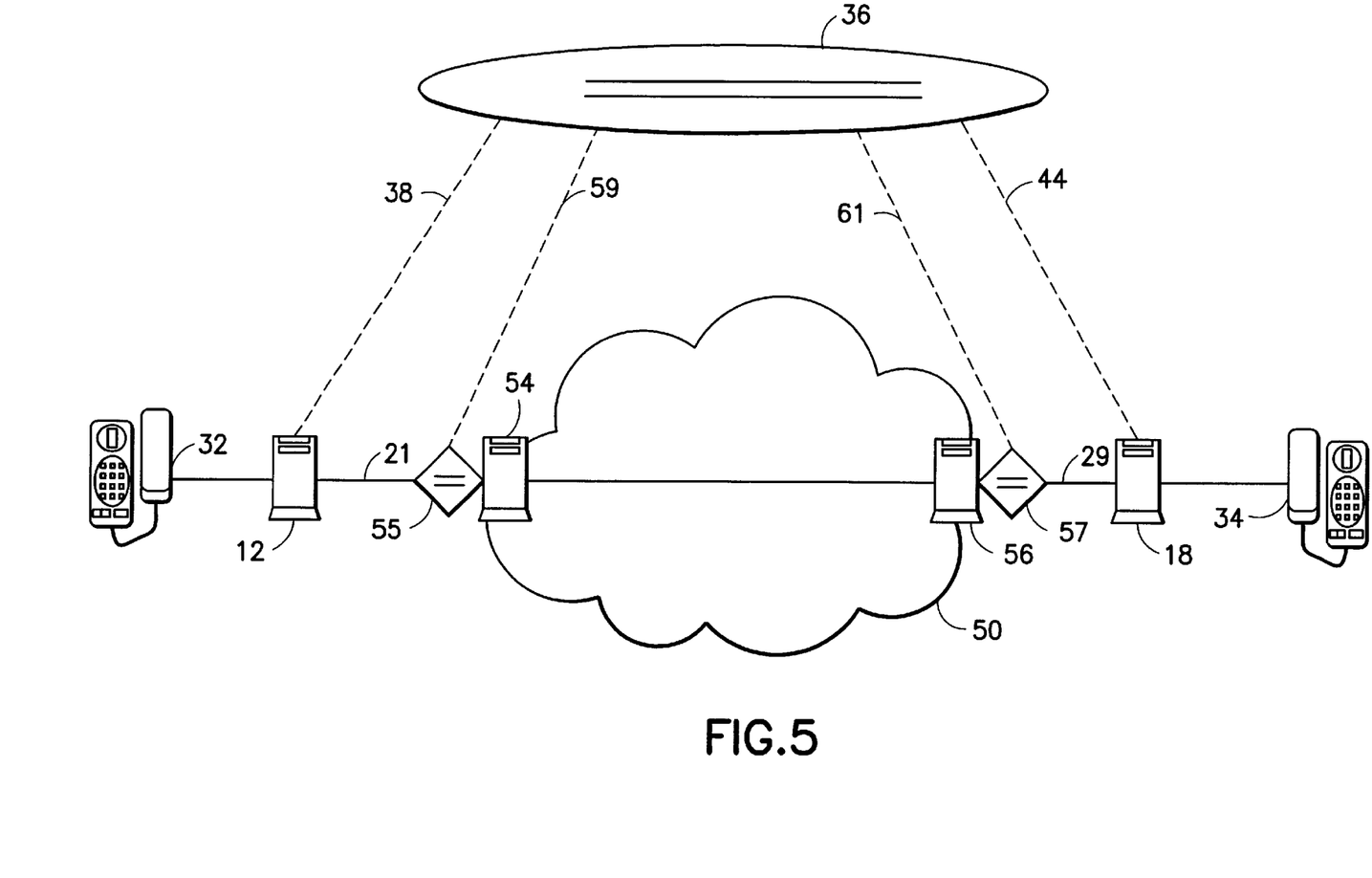
FIG. 5 is a schematic illustration of a proposed implementation of a co-owned invention for transporting narrowband (voice) traffic over a broadband (atm) network.

Previously incorporated co-owned applications Ser. Nos. 09/289,463 and 09/289,464 disclose a method and apparatus for mapping narrowband (DS0) voice circuits into AAL2 type SVCs and for generating AAL2 type ATM SETUP messages from SS7 and other SETUP messages. The DS0 data streams are coupled to an ATM switch via T1/E1 line interface modules and a voice server module (VSM). Details regarding the VSM are disclosed in co-owned Ser. Nos. 09/015,403 and 09/015,302, the complete disclosures of which are hereby incorporated by reference herein. The VSM is also coupled to the SS7 network so that call setup messages can be mapped to the ATM network. Collectively, the methods and apparatus of the previously incorporated co-owned applications are referred to as an interworking function (IWF) which is made part of an ATM edge switch and is typically co-located with and coupled to a class 4/5 switch in a CO. FIG. 5 illustrates a proposed arrangement for the IWF.

The components shown in FIG. 5 are taken from FIGS. 1 and 3 and bear the same reference numerals where appropriate. Thus a class 4/5 switch 12 servicing a subscriber line 32 and a class 4/5 switch 18 servicing a subscriber line 34 are the same as those shown in FIG. 1. These switches are coupled to the SS7 network 36 by signalling links 38 and 44 respectively. Similarly, the ATM switches 54 and 56 coupled to the ATM network 50 are the same as those shown in FIG. 3 except that each of these switches has been provided with an IWF (55 and 57 respectively). The IWF 55 is coupled via a trunk line 21 to the class 4/5 switch 12 and is coupled to the SS7 network via a DS0 signalling link 59. Similarly, the IWF 57 is coupled via a trunk line 29 to the class 4/5 switch 18 and is coupled to the SS7 network via a DS0A signalling link 61. Under this proposal, a call setup signal (IAM) from the switch 12 is sent via the link 38 to the SS7 network 36 which sends the signal via the link 59 to the IWF 55. The IWF 55 determines which ATM switch will be used to complete the call and sends Q.2931 connection control messages over the ATM network 50 to the ATM switch 56 to establish a SVC between the ATM switches to handle the call payload. The IWF 55 also determines which class 4/5 switch will be used to complete the call and sends a signal (IAM) vial the SS7 network to the switch 18. The switches communicate in this manner until a connection is completed. The payload for the call is mapped to and mapped from ATM cells by the IWF at both ends of the circuit. A disadvantage of this approach is that it requires many DS0 connections from ATM switches to the SS7 network and a point code for each. This can become very expensive. In addition to this disadvantage, there is also the possibility that the processing of SS7 signalling information within an ATM switch will be congested.

Figure 6:
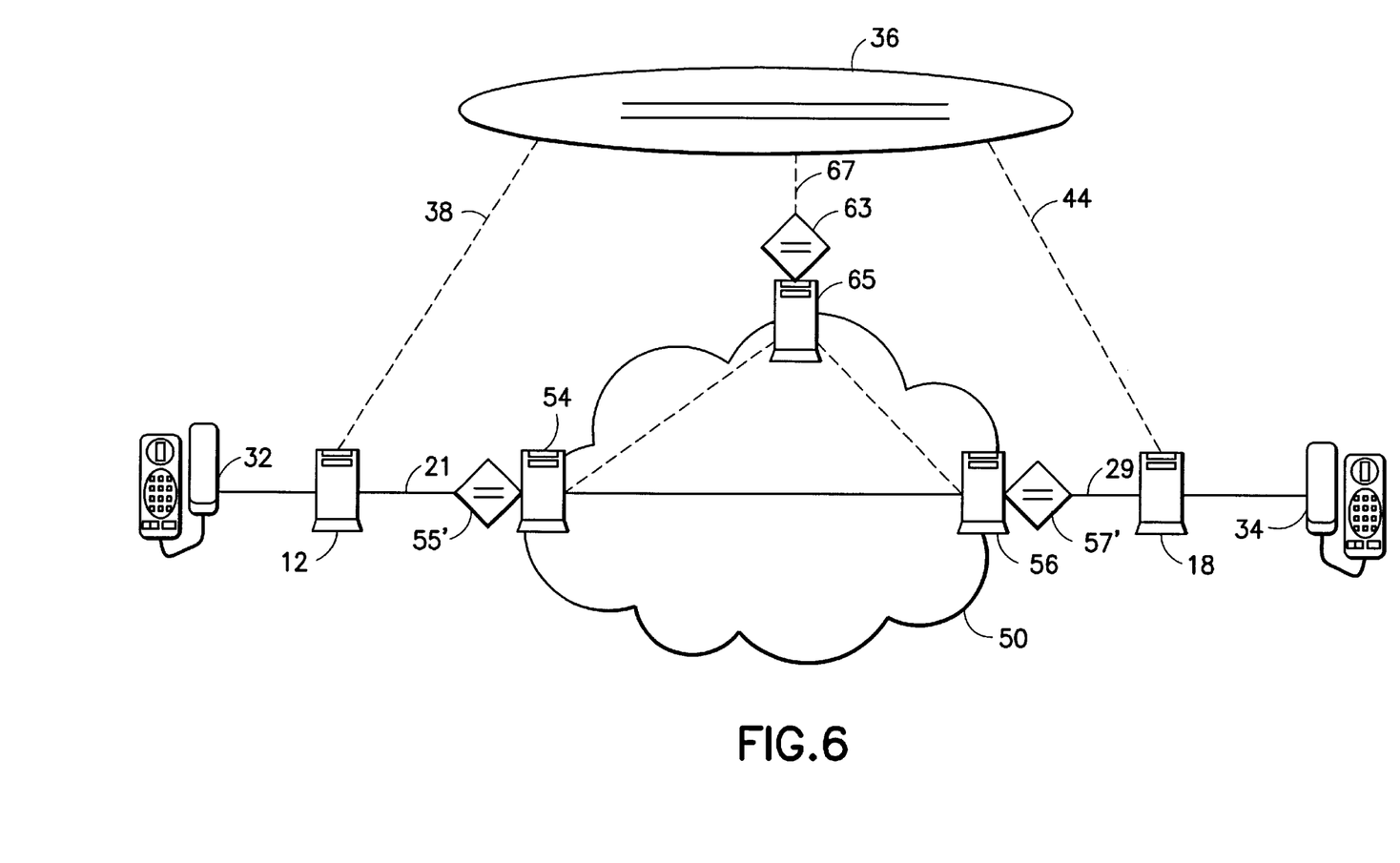
FIG. 6 is a schematic illustration of another proposed implementation of the co-owned invention for transporting narrowband (voice) traffic over a broadband (atm) network.

Another proposed way of implementing an IWF is to separate the functions of signalling mapping and payload mapping so that all signalling mapping is handled at a central location. FIG. 6 illustrates how this approach might be realized. According to this proposal, the IWF 55' and the IWF 57' only process payload. A central signalling IWF 63 is coupled to the ATM network via ATM switch 65 and is coupled to the SS7 network via a DS0 67. According to this approach, all SS7 signalling for calls which will be routed through the ATM network is processed by the IWF 63, converted into ATM signalling, and sent via switch 65 to the appropriate ATM switches in order to set up the SVC for the call. A disadvantage of this approach is that it is not scalable, i.e. the IWF 63 and switch 65 will soon be overloaded. Moreover, the processing of SS7 signalling information within the central signalling IWF and ATM switch will likely be congested frequently.

SUMMARY OF THE INVENTION

It is therefore an object of the invention to provide methods and apparatus for distributing interworking functionality over the ATM network which does not require numerous links to the SS7 network.

It is also an object of the invention to provide methods and apparatus for distributing interworking functionality over the ATM network which are scalable.

It is another object of the invention to provide methods and apparatus for distributing interworking functionality within an ATM switch so that the processing of SS7 signalling information will be distributed among several processors.

In accord with these objects which will be discussed in detail below, the methods and apparatus of the present invention include providing an SS7 signalling router and coupling it to the SS7 network and an ATM switch. The SS7 signalling router receives SS7 signalling regarding narrowband calls to be routed over the ATM network. When the SS7 router receives signalling from the SS7 network, it does not process the signalling. Rather, it reads the originator point code (OPC) and forwards the signalling via the ATM network to the ATM switch which is attached to the originator of the message, e.g. the class 4/5 switch attached to an edge ATM switch. The IWF at the ATM switch processes the SS7 signalling by generating the appropriate ATM signalling to set up a circuit between the originating ATM switch and the destination ATM switch. The IWF at the originating ATM switch also processes the SS7 signalling by returning it to the SS7 router with the destination point code (DPC) of the class 4/5 switch coupled to the destination ATM switch. When the SS7 router receives an SS7 signalling message from an ATM switch, it forwards it to the SS7 network where it is sent to the DPC, typically a class 4/5 switch coupled to an edge ATM switch. According to a presently preferred embodiment, the SS7 router passes a portion of the SS7 signal (the MP3 layer and above) to the ATM switches via the SAAL layer of an ATM VC. The methods and apparatus enable the formation of what may be thought of as a "virtual tandem switch".

According to a further object of the invention, the IWF at each ATM switch is distributed among several processors. Preferably one signalling VSM controller (an SVSM) is coupled to a plurality of VSM controllers and an ISUP controller. SS7 SUs enter the SVSM controller which separates MSUs from FISUs and LSSUs. The MSUs are sent to the ISUP controller which interrogates the CIC of the IAM messages and forwards the IAM information to the appropriate VSM controller for narrowband to broadband conversion and processing. The FISUs and LSSUs are processed by the SVSM controller. According to this preferred embodiment, actual call control messages are distributed among VSM controllers and the ISUP controller acts as an ISUP signalling proxy for all of the VSM controllers in the ATM switch. This arrangement permits multiple IAM SUs to be processed simultaneously thereby reducing call setup time and increasing signalling performance (number of call setup requests processed per second).

Additional objects and advantages of the invention will become apparent to those skilled in the art upon reference to the detailed description taken in conjunction with the provided figures.

DETAILED DESCRIPTION OF THE PREFERRED EMBODIMENTS

Figure 7:
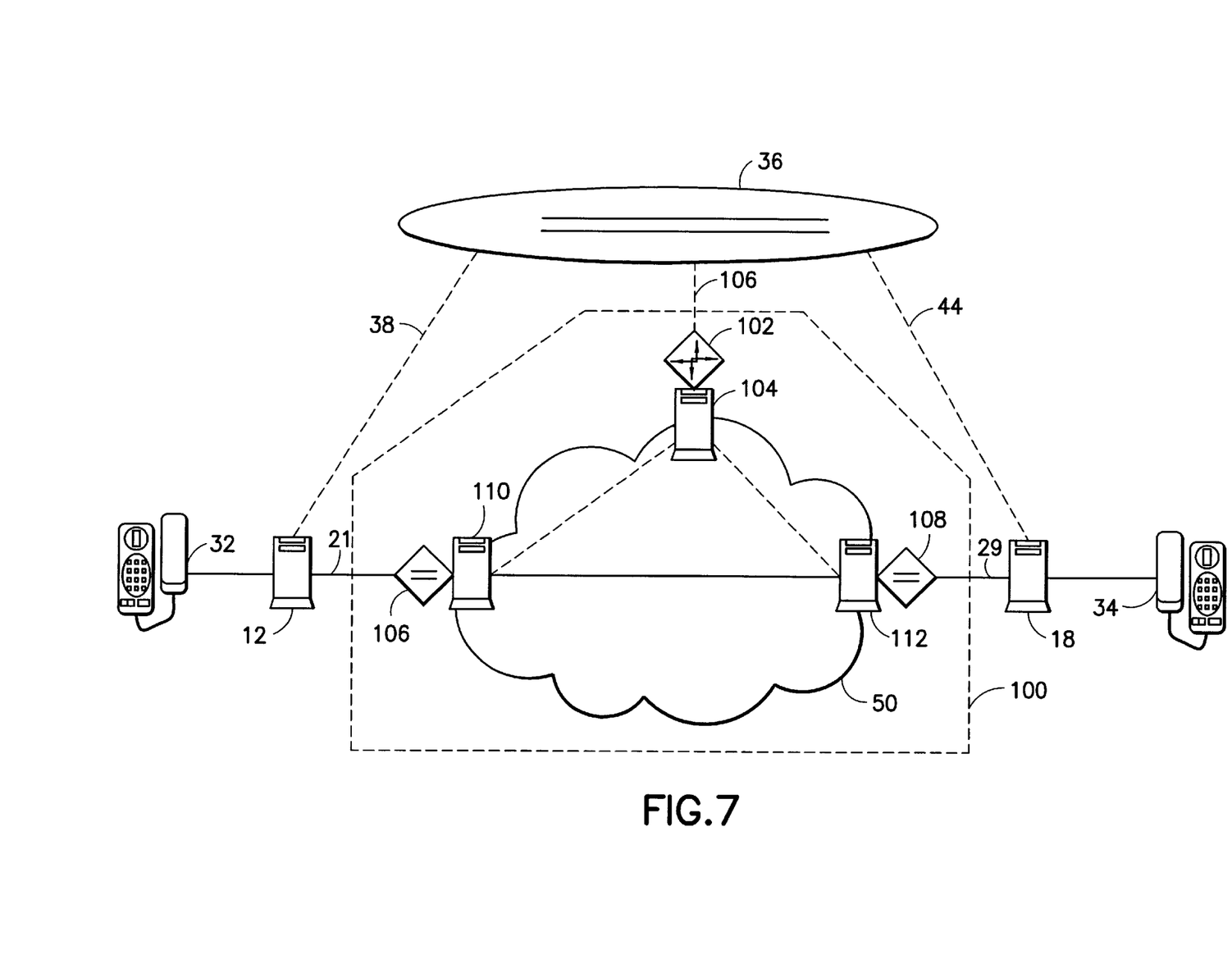
FIG. 7 is a schematic illustration of an implementation according to the present invention for transporting narrowband (voice) traffic over a broadband (atm) network.

Referring now to FIG. 7, the methods and apparatus of the invention enable the formation of a "virtual tandem switch" 100 which is coupled to the PSTN in a manner similar to that described in reference to FIG. 6. Thus, some reference numerals in FIG. 7 are identical to reference numerals in FIG. 6 and refer to identical components. Unlike the arrangement of FIG. 6, the "virtual tandem switch" 100 shown in FIG. 7 includes an SS7 signalling router 102 which is coupled to the ATM network 50 via an ATM switch 104 and which is coupled to the SS7 network 36 via a DS0 or similar link 106. In actual practice, the SS7 signalling router 102 may comprise one or more cards in slots of the ATM switch. The "virtual tandem switch" 100 also includes a plurality of interworking functions (IWF), e.g. 106, 108 which are coupled to (or part of) ATM switches, e.g. 110, 112. ATM switches 110, 112 which are provided with IWF 106, 108 are coupled to respective PSTN switches 12, 18 via trunk lines 21, 29 (e.g. T1/E1 lines).

Figure 8:
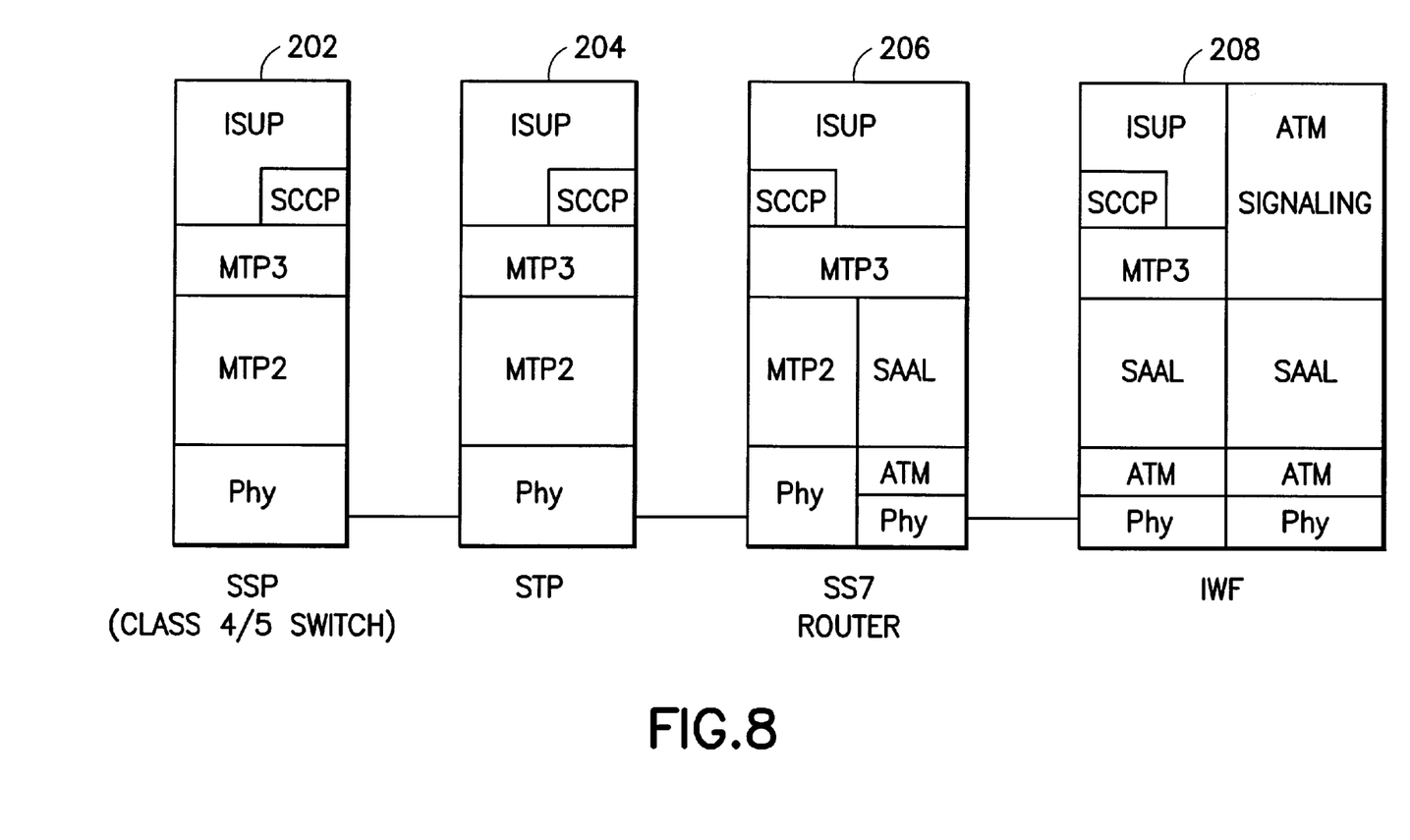
FIG. 8 is a schematic illustration of how SS7 signals are mapped into ATM cells according to the invention.

According to the invention, the SS7 signalling router 102 receives SS7 signalling regarding narrowband calls to be routed over the ATM network. For example, when the subscriber line 32 initiates a call, the switch 12 sends an SS7 signalling unit via the link 38 to the SS7 network 36. The SS7 router 102 receives the signalling unit from the SS7 network 36. It does not process the signalling other than to read the originator point code (OPC) and forward the signalling via the ATM network 50 to the ATM switch 110 which is attached to the originator of the signalling, i.e. the class 4/5 switch 12. The IWF 106 at the ATM switch 110 processes the SS7 signalling by generating the appropriate ATM signalling to setup a circuit between the originating ATM switch 110 and the destination ATM switch, e.g. switch 112. The IWF 106 at the originating ATM switch 110 also processes the SS7 signalling by returning it to the SS7 router 102 with the destination point code (DPC) of the class 4/5 switch 18 which is coupled to the destination ATM switch 112. When the SS7 router 102 receives an SS7 signalling message from an ATM switch, it forwards it to the SS7 network 36 where it is sent to the DPC, e.g. the switch 18 coupled to the ATM switch 112. According to a presently preferred embodiment, the SS7 router 102 passes a portion of the SS7 signal (the MP3 layer and above) to the ATM switches via the SAAL layer of an ATM VC. FIG. 8 illustrates the mapping of SS7 signalling units in more detail.

Turning now to FIG. 8, the protocol stack 200 illustrates the SS7 message generated by a signalling service point (SSP), e.g. a class 4/5 switch. The ISUP and SCCP protocols are supported by the routing layer MTP3 and the link layer MTP2 and are transmitted over the physical link (typically a DS0) to a signal transfer point (STP) in the SS7 network. The STP receives the message stack as shown at 204. If the addressing indicates that the call is to be routed through the ATM network, the STP forwards the stack to the SS7 router. The stack(s) shown at 206 illustrate how the SS7 router maps the ISUP and SCCP protocols plus the routing layer MTP3 onto the SAAL layer of the ATM protocol. The stack(s) 208 illustrate in very high level how the IWF converts the ISUP and SCCP protocols plus the routing layer MTP3 into ATM signalling which is supported by the SAAL in the ATM network.

Figure 9:
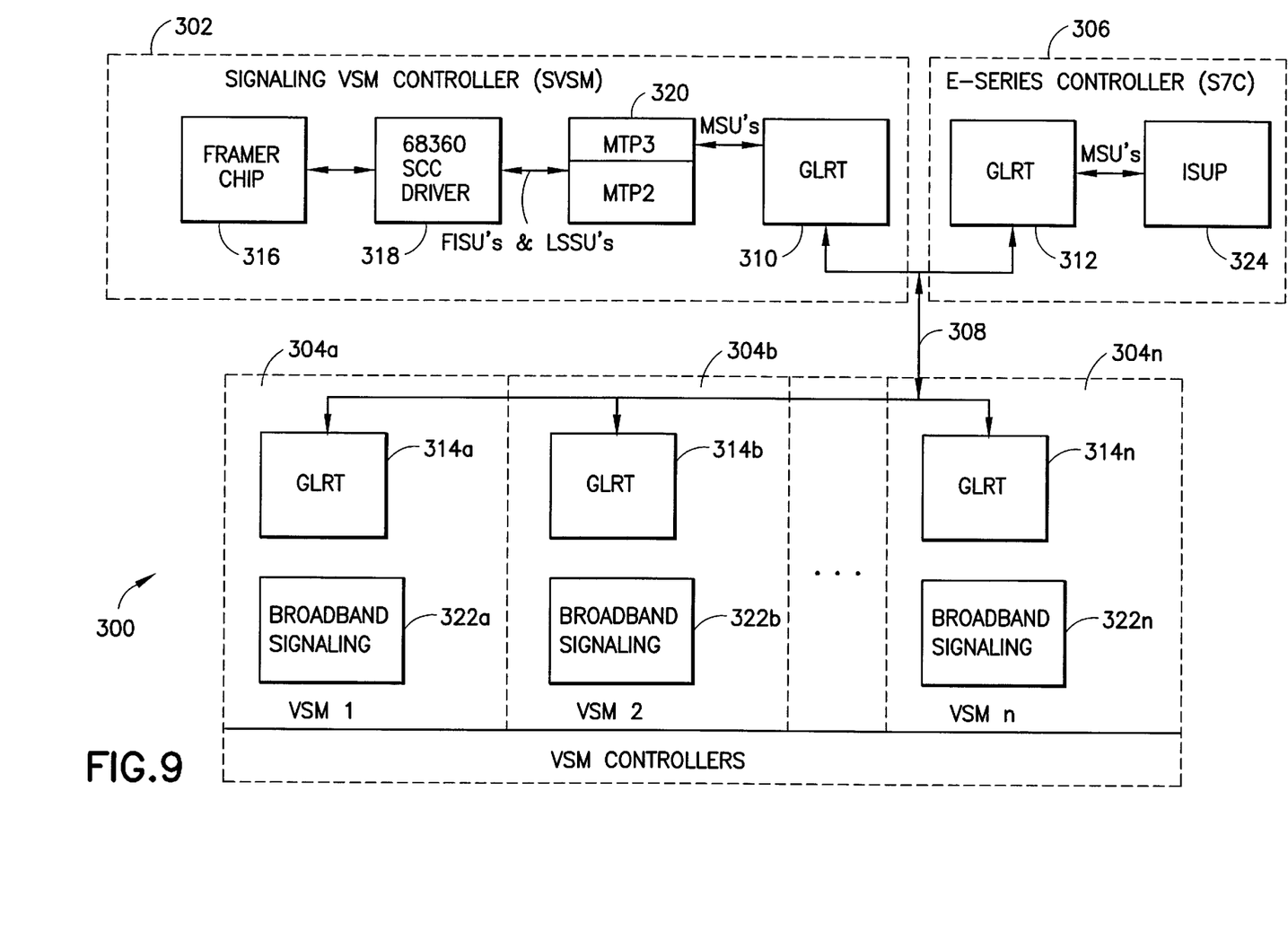
FIG. 9 is a schematic diagram of a presently preferred embodiment of the invention wherein SS7 signal processing is distributed among several processors in an ATM switch.

As mentioned above, according to a further object of the invention, the IWF at each ATM switch in the "virtual tandem switch" is distributed among several processors. FIG. 9 illustrates a presently preferred embodiment of an IWF 300. The IWF 300 includes one signalling VSM controller (an SVSM) 302, a plurality of VSM controllers 304a–304n, and an ISUP controller 306. The SVSM 302, VSM controllers 304a–304n, and ISUP controller 306 are coupled to each other via a bus 308 and bus interfaces 310, 312, and 314a–314n which preferably utilize the a lightweight reliable transport protocol such as the GDC GLRT protocol. The SVSM 302 includes a framer 316, an SCC (serial communication controller) driver 318, and a signalling unit reader 320. Each VSM controller 304a–304n has its own broadband signalling stack 322a–322n. The ISUP controller 306 includes an ISUP message reader 324.

SS7 SUs enter the SVSM controller 302 where they are framed by the framer 316 and driven by the driver 318 to the SU reader 320 which separates MSUs from FISUs and LSSUs. The MSUs are sent via the bus 308 to the ISUP controller 306 which interrogates the CIC of the IAM messages with the ISUP reader 324 and forwards the IAM information via the bus 308 to the appropriate VSM controller 304a–304n for narrowband to broadband conversion and processing by the broadband signalling stack 322a–322n. The FISUs and LSSUs are processed by the SVSM controller 302 using microcode from TRILLIUM. According to this preferred embodiment, actual call control messages are distributed among VSM controllers 304a–304n and the ISUP controller 306 acts as an ISUP signalling proxy for all of the VSM controllers in the ATM switch. The ISUP controller 306 reads the CIC of MSUs to determine the DS0 (actually slot/link/DS0) associated with the message. Each DS0 corresponds to a particular VSM controller (each VSM controller handles many DS0s). This arrangement permits multiple IAM SUs to be processed simultaneously thereby reducing call setup time and increasing signalling performance (number of call setup requests processed per second).

There have been described and illustrated herein methods and apparatus for transporting narrowband (voice) traffic over a broadband (ATM) network. While particular embodiments of the invention have been described, it is not intended that the invention be limited thereto, as it is intended that the invention be as broad in scope as the art will allow and that the specification be read likewise. Thus, while particular IWF have been disclosed, it will be appreciated that other IWF could be utilized with the SS7 router method and apparatus. Moreover, the preferred IWF may have utility apart from the SS7 router method and apparatus. Those skilled in the art will appreciate that the invention may be applied to connections which have narrowband switches at only one end of the call. For example, the invention may be used to route voice circuit modem traffic from a PSTN switch to a network server which is directly coupled to an ATM switch so that there is only one PSTN switch involved in the call. It will therefore be appreciated by those skilled in the art that yet other modifications could be made to the provided invention without deviating from its spirit and scope as so claimed.

What is claimed is:

1. A system for transporting narrowband voice traffic from an originating PSTN switch which is coupled to an SS7 network, over a broadband ATM network, comprising:

a) a first ATM switch coupled to the ATM network and coupled to the originating PSTN switch, said first ATM switch having a first interworking function means for converting SS7 signalling into ATM signalling;

b) a second ATM switch coupled to the ATM network;

c) an SS7 signalling router coupled to the SS7 network and to the ATM network, wherein said SS7 signalling router includes means for receiving, via the SS7 network, an SS7 SU generated by the originating PSTN, means for mapping at least a portion of the SS7 SU into one or more ATM cells, means for sending the one or more ATM cells via the ATM network to said first ATM switch, said interworking function means includes means for reading the SS7 SU from the one or more ATM cells, converting the SS7 SU into ATM signalling and sending the ATM signalling via one or more ATM cells to said second ATM switch in order to establish a VC between said first ATM switch and said second ATM switch.

2. A system according to claim 1, wherein:

said means for mapping maps a portion of the SS7 SU comprising the MTP3 layer and higher into one or more ATM cells.

3. A system according to claim 1, wherein:

said first ATM switch is coupled to a plurality of originating PSTN switches, said interworking function means includes a corresponding plurality of processing means for converting SS7 signalling into ATM signalling and controller means for distributing SS7 MSUs among said plurality of processing means.

4. A system according to claim 1, for transporting narrowband voice traffic from the originating PSTN switch to a destination PSTN switch which is coupled to an SS7 network, over a broadband ATM network, wherein:

said second ATM switch is coupled to the destination PSTN switch, said second ATM switch has a second interworking function means for converting SS7 signalling into ATM signalling, said SS7 signalling router includes means for receiving, via the SS7 network, an SS7 SU generated by the destination PSTN, and means for sending one or more ATM cells via the ATM network to said second ATM switch, said second interworking function means includes means for reading the SS7 SU from the one or more ATM cells, converting the SS7 SU into ATM signalling and sending the ATM signalling via one or more ATM cells to said first ATM switch in order to establish a VC between said first ATM switch and said second ATM switch.

5. A system according to claim 4, for transporting narrowband voice traffic from the originating PSTN switch to a plurality of destination PSTN switches which are coupled to an SS7 network, over a broadband ATM network, wherein:

said second ATM switch is coupled to the plurality of destination PSTN switches, said second interworking function means includes a corresponding plurality of processing means for converting SS7 signalling into ATM signalling and controller means for distributing SS7 MSUs among said plurality of processing means.

6. A system for transporting narrowband voice traffic from a plurality of originating PSTN switches which are coupled to an SS7 network, over a broadband ATM network, comprising:

a) a first ATM switch coupled to the ATM network and coupled to the plurality of originating PSTN switches; and b) a first interworking function means coupled to said first ATM switch for receiving SS7 signalling from the plurality of originating PSTN switches, wherein said first interworking function means includes a corresponding plurality of processing means for converting SS7 signalling into ATM signalling and controller means for distributing SS7 MSUs among said plurality of processing means.

7. A system according to claim 6, further comprising:

c) a second ATM switch coupled to the ATM network;

d) an SS7 signalling router coupled to the SS7 network and to the ATM network, wherein said SS7 signalling router includes means for receiving, via the SS7 network, SS7 SUs generated by the originating PSTN switches, and means for sending the one or more ATM cells via the ATM network to said first ATM switch, said first interworking function means includes means for reading the SS7 SU from the one or more ATM cells, distributing the MSU from the SU to one of said plurality of processing means which converts the SS7 SU into ATM signalling and sending the ATM signalling via one or more ATM cells to said second ATM switch in order to establish a VC between said first ATM switch and said second ATM switch.

8. A system according to claim 7, wherein:

said SS7 signalling router includes means for mapping a portion of the SS7 SU comprising the MTP3 layer and higher into one or more ATM cells.

9. A system according to claim 7, for transporting narrowband voice traffic from the plurality of originating PSTN switches to a destination PSTN switch which is coupled to an SS7 network, over a broadband ATM network, wherein:

said second ATM switch is coupled to the destination PSTN switch, said second ATM switch has a second interworking function means for converting SS7 signalling into ATM signalling, said SS7 signalling router includes means for receiving, via the SS7 network, an SS7 SU generated by the destination PSTN, and means for sending the one or more ATM cells via the ATM network to said second ATM switch, said second interworking function means includes means for reading the SS7 SU from the one or more ATM cells, converting the SS7 SU into ATM signalling and sending the ATM signalling via one or more ATM cells to said first ATM switch in order to establish a VC between said first ATM switch and said second ATM switch.

10. A system according to claim 9, for transporting narrowband voice traffic from the plurality of the originating PSTN switches to a plurality of destination PSTN switches which are coupled to an SS7 network, over a broadband ATM network, wherein:

said second ATM switch is coupled to the plurality of destination PSTN switches, said second interworking function means includes a corresponding plurality of processing means for converting SS7 signalling into ATM signalling and controller means for distributing SS7 MSUs among said plurality of processing means.

11. A method for transporting narrowband voice traffic from an originating PSTN switch which is coupled to an SS7 network and to a first ATM switch which is coupled to an ATM network over the ATM network to a second ATM switch which is coupled to the ATM network, said method comprising:

a) receiving from the SS7 network SS7 signalling messages generated by the originating PSTN switch;

b) mapping at least a portion of the SS7 SU into one or more ATM cells;

c) sending the one or more ATM cells via the ATM network to the first ATM switch;

d) converting the SS7 SU at the first ATM switch into ATM signalling; and e) sending the ATM signalling via one or more ATM cells to the second ATM switch in order to establish a VC between the first ATM switch and the second ATM switch.

12. A method according to claim 11, wherein:

said step of mapping comprises mapping a portion of the SS7 SU comprising the MTP3 layer and higher into one or more ATM cells.

13. A method according to claim 11, wherein:

the first ATM switch is coupled to a plurality of originating PSTN switches, said step of converting the SS7 SU includes distributing SS7 MSUs among a plurality of processing means.

14. A method according to claim 11, for transporting narrowband voice traffic from the originating PSTN switch to a destination PSTN switch which is coupled to the SS7 network, over a broadband ATM network, wherein the second ATM switch is coupled to the destination PSTN switch, said method further comprising:

f) receiving from the SS7 network SS7 signalling messages generated by the destination PSTN switch;

g) mapping at least a portion of the SS7 SU into one or more ATM cells;

h) sending the one or more ATM cells via the ATM network to the second ATM switch;

i) converting the SS7 SU at the second ATM switch into ATM signalling; and j) sending the ATM signalling via one or more ATM cells to the first ATM switch in order to establish a VC between the first ATM switch and the second ATM switch.

15. A method according to claim 14, for transporting narrowband voice traffic from the originating PSTN switch to a plurality of destination PSTN switches which are coupled to an SS7 network, over a broadband ATM network, wherein:

said step of converting the SS7 SU at the second ATM switch into ATM signalling includes distributing SS7 MSUs among a plurality of processing means.

16. A method for transporting narrowband voice traffic over an ATM network from a plurality of originating PSTN switches which are coupled to an SS7 network and to a first ATM switch, said method comprising:

a) receiving SS7 signalling from the plurality of originating PSTN switches;

b) distributing SS7 MSUs among a plurality of processing means at the first ATM switch; and c) converting the SS7 MSUs at the plurality of processing means into ATM signalling.

17. A method according to claim 16, further comprising:

d) receiving from the SS7 network SS7 signalling messages generated by the originating PSTN switches;

e) mapping at least a portion of each SS7 SU into one or more ATM cells;

f) sending the one or more ATM cells via the ATM network to the first ATM switch; and g) converting the SS7 SU at the first ATM switch into ATM signalling.

18. A method according to claim 17, wherein:

said step of mapping includes mapping a portion of the SS7 SU comprising the MTP3 layer and higher into one or more ATM cells.

19. A method according to claim 17, for transporting narrowband voice traffic from the plurality of originating PSTN switches to a destination PSTN switch which is coupled to an SS7 network and a second ATM switch, over the broadband ATM network, wherein:

h) receiving from the SS7 network SS7 signalling messages generated by the destination PSTN switch;

i) mapping at least a portion of the SS7 SU into one or more ATM cells;

j) sending the one or more ATM cells via the ATM network to the second ATM switch;

k) converting the SS7 SU at the second ATM switch into ATM signalling; and l) sending the ATM signalling via one or more ATM cells to the first ATM switch in order to establish a VC between the first ATM switch and the second ATM switch.

20. A method according to claim 19, for transporting narrowband voice traffic from the plurality of the originating PSTN switches to a plurality of destination PSTN switches which are coupled to the second ATM switch and the SS7 network, over the broadband ATM network, wherein:

said step of converting the SS7 SU at the second ATM switch into ATM signalling includes distributing SS7 MSUs among a plurality of processing means.

* * * * *